(12) United States Patent
Hartmann et al.

(10) Patent No.: US 11,566,673 B2
(45) Date of Patent: Jan. 31, 2023

(54) BEARING ASSEMBLY FOR A BRAKE CARRIER

(71) Applicant: SAF-HOLLAND GmbH, Bessenbach (DE)

(72) Inventors: Mark Hartmann, Sulzbach am Main (DE); Stefan Wallmeier, Goldbach (DE)

(73) Assignee: SAF-HOLLAND Gmbh, Bessenbach (DE)

( * ) Notice: Subject to any disclaimer, the term of this patent is extended or adjusted under 35 U.S.C. 154(b) by 104 days.

(21) Appl. No.: 16/762,377

(22) PCT Filed: Nov. 7, 2018

(86) PCT No.: PCT/EP2018/080475
§ 371 (c)(1),
(2) Date: May 7, 2020

(87) PCT Pub. No.: WO2019/092019
PCT Pub. Date: May 16, 2019

(65) Prior Publication Data
US 2020/0284309 A1     Sep. 10, 2020

(30) Foreign Application Priority Data
Nov. 9, 2017 (DE) .................... 10 2017 126 200.8

(51) Int. Cl.
*F16D 65/02* (2006.01)
*F16D 55/226* (2006.01)
(Continued)

(52) U.S. Cl.
CPC ........... *F16D 55/226* (2013.01); *F16D 65/02* (2013.01); *F16D 65/183* (2013.01); *F16D 2055/0008* (2013.01)

(58) Field of Classification Search
CPC ........ F16D 55/00; F16D 55/22; F16D 55/228; F16D 55/2255; F16D 55/2265; F16D 65/02; F16D 65/0056
(Continued)

(56) References Cited

U.S. PATENT DOCUMENTS 3,613,836 A * 10/1971 Dowell .................. F16D 55/22
188/71.1
3,999,635 A * 12/1976 Hotchkiss ........... F16D 55/2262
188/72.5
(Continued)

FOREIGN PATENT DOCUMENTS

DE        20021587 U1    5/2001
DE    112007003053 T5   10/2009
(Continued)

OTHER PUBLICATIONS

European Patent Office; International Search Report; dated Feb. 5, 2019.

*Primary Examiner* — Christopher P Schwartz
(74) *Attorney, Agent, or Firm* — Price Heneveld LLP

(57) ABSTRACT

A bearing assembly for a brake carrier for a utility vehicle, includes a retaining element and a brake support element, wherein the retaining element is fixed to an axle or a chassis component by form fit, substance bonding and/or force fit, wherein the axle extends along an axial direction, wherein the brake support element has a first mounting region, wherein the retaining element has a first retaining region, and wherein the first mounting region is configured to be brought into direct or indirect engagement with the first retaining region such that a displacement along a first transverse direction between the retaining element and brake support element is prevented by form fit.

20 Claims, 3 Drawing Sheets

(51) Int. Cl.
*F16D 65/18* (2006.01)
*F16D 55/00* (2006.01)

(58) Field of Classification Search
USPC ............... 188/71.1, 73.31, 73.39, 73.46
See application file for complete search history.

(56) References Cited

U.S. PATENT DOCUMENTS

| | | | | |
|---|---|---|---|---|
| 4,046,231 | A * | 9/1977 | Ohorl | F16D 55/22 |
| | | | | 188/71.1 |
| 6,935,468 | B2 * | 8/2005 | Regazzoni | B62K 19/38 |
| | | | | 188/71.1 |
| 7,673,724 | B2 * | 3/2010 | Baumgartner | F16D 55/00 |
| | | | | 188/73.31 |
| 9,506,512 | B2 * | 11/2016 | Plantan | F16D 65/02 |
| 10,385,936 | B2 * | 8/2019 | Morano | F16D 65/0056 |
| 2005/0150729 | A1 * | 7/2005 | Baumgartner | F16D 55/2255 |
| | | | | 188/72.9 |
| 2007/0137953 | A1 * | 6/2007 | Paul | F16D 55/228 |
| | | | | 188/73.46 |
| 2010/0012443 | A1 | 1/2010 | Paul et al. | |

FOREIGN PATENT DOCUMENTS

| | | |
|---|---|---|
| DE | 102014113369 A1 | 3/2016 |
| WO | 2005095815 A1 | 10/2005 |
| WO | 2017040029 A1 | 3/2017 |

* cited by examiner

BEARING ASSEMBLY FOR A BRAKE CARRIER

BACKGROUND

The invention concerns a bearing assembly for a brake carrier which is used in particular in utility vehicles.

Bearing assemblies for brake carriers are known from the prior art. These serve to fix a brake carrier to an axle, shaft or chassis component. The brake carrier comprises or carries in particular a brake caliper which serves to mount or guide the brake pads of the brake caliper. The problem with the bearing assemblies known in the prior art is that these entail a high handling complexity, in particular for mounting or maintenance, since they must be supported or held by external means until the brake carrier can be fixed in position, usually by bolts.

It is therefore an object of the present invention to provide a bearing assembly for a brake carrier which entails only low complexity in mounting and maintenance.

SUMMARY

According to the invention, a bearing assembly for a brake carrier, in particular for a utility vehicle, comprises a retaining element and a braking means support element, wherein the retaining element is or can be fixed by form fit, substance bonding and/or force fit to an axle or a chassis component, wherein the axle extends along an axial direction, wherein the braking means support element has a first mounting region, wherein the retaining element has a first retaining region, and wherein the first mounting region is or can be brought into direct or indirect engagement with the first retaining region, such that a displacement along a first transverse direction between the retaining element and the braking means support element is prevented by form fit. The bearing assembly according to the invention is used in particular in disc brakes, wherein this bearing assembly serves to mount a brake carrier.

A brake carrier is the element of a brake, in particular a disc brake, which holds or supports the friction elements, in particular the brake pads. In other words, the brake carrier may be a brake caliper. The braking means support element is the in particular integral element of the bearing assembly which serves to hold or mount the friction elements of the brakes directly or indirectly. The braking means support element may be a separate component which is arranged in the force flow between the retaining element and the brake carrier, or alternatively may also be part of the brake carrier. Preferably, the braking means support element in mounted state does not rotate, or even stands completely still relative to the vehicle on which the braking means support element is fixed. The retaining element of the bearing assembly is the element which serves for fixing to the axle, a shaft or chassis component. A chassis component in particular is formed by a part of the damping and/or suspension system or by a region or part of the vehicle chassis. Alternatively, preferably the retaining element may also be part of the wheel bearing housing. It is decisive that the retaining element is configured to fix the braking means support element to the axle, shaft or chassis component. Preferably, the retaining element is made of a metallic material, in particular steel, preferably spring steel. In an exemplary embodiment, the retaining element is pressed onto the axle or formed as a clamping strap around the axle. Alternatively, preferably the retaining element may also be configured as a welded construction. Suitably, the retaining element consists of a ductile material such as for example spring steel, wherein it is preferred if an intermediate element is introduced between the retaining element and the axle so that the retaining element is clamped to the axle via the intermediate element. The axle, on which the retaining element is arranged by form fit, substance bonding and/or by force fit, is preferably the supporting or driving element of the axle to be braked, wherein the axial direction may amongst others be the direction about which the wheel rotates which is to be braked by means of the brake. Preferably, the axial direction is therefore in particular the direction which determines the width of the vehicle in which the bearing assembly is arranged or is designed to be arranged. The first retaining region of the retaining element, and the first mounting region of the braking means support element, serve to transmit forces and/or moments from the retaining element to the braking means support element. In an exemplary embodiment, the first mounting region and the first retaining region are configured as a keyway connection, wherein it is preferred if the key extends in the first transverse direction. It is important that the first retaining region is or can be brought into engagement with the first mounting region such that a displacement between the retaining element and the braking means support element in the first transverse direction, in the positive and/or negative direction, is prevented by form fit. Preferably, this form fit is achieved in that regions of the first retaining region stand in direct contact with the first mounting region. Alternatively, preferably this form fit may also be achieved by the use of intermediate elements. The first transverse direction is the direction which stands perpendicularly to the axial direction. The first transverse direction therefore lies in an axial directional plane which has a normal parallel to the axial direction. The first transverse direction is in particular the direction in which the brake carrier extends on both sides of the rotation axis of the axle. In other words, the first transverse direction is in particular the direction in an axial directional plane in which the brake pads are oriented. With a vertical arrangement of the brake pads in the vehicle, the first transverse direction is therefore oriented preferably parallel to the vector of gravity. The form-fit prevention of displacement in the first transverse direction substantially simplifies the mounting of the bearing assembly, so that in particular costs can be saved in mounting and maintenance.

Preferably, the retaining element is reversibly or detachably arranged on the braking means support element. The phrase "reversibly or detachably arranged" means that the retaining element is reversibly connected to the braking means support element, so that the two components can be separated from each other without destruction. This may be achieved in particular with a bolted connection. The reversible arrangement of the retaining element relative to the braking means support element simplifies the mounting and maintenance of the brakes.

Advantageously, the first retaining region and/or the first mounting region are mirror-symmetrical relative to a plane, wherein this plane of symmetry in particular has a normal in the axial direction. The mirror-symmetrical configuration of the first retaining region and/or the first mounting region relative to the plane of symmetry means that production is simplified so that costs can be saved.

Suitably, the first retaining region has a first retaining face, wherein the first mounting region has a first mounting face, and wherein the first retaining face and the first mounting face contact each other directly or can be brought into direct contact, so that a displacement in the first transverse direction is or can be prevented by the direct contact of the first retaining face with the first mounting face. The first retaining face is therefore configured such that this comes or can come into direct contact with the first mounting face in the first mounting region. This form-fit contact between the first retaining face of the retaining region and the first mounting face of the mounting region is therefore designed such that a displacement of the two faces relative to each other in the first transverse direction is or can be prevented by the direct contact. In particular, the contact is configured such that this prevents displacement in the positive and/or negative first transverse direction. The negative first transverse direction is in particular characterized in that this is the first transverse direction which, starting from the first mounting region, points away from the axial direction. The direct contact of the first retaining face with the first mounting face firstly ensures that mounting is simplified, and secondly, this direct contact achieves a damping effect on vibrations caused by the contact damping, which is advantageous in particular with respect to brake squeal.

Preferably, the first retaining face and the first mounting face are substantially flat. A face is substantially flat if it has two perfectly parallel planes which are spaced from each other in normal directions by maximum 1 mm, preferably 0.5 mm and particularly preferably 0.2 mm, or do not touch or puncture each other. The first retaining face and/or the first mounting face here preferably has a flat area of at least 35 mm². In this way, a particularly safe transmission of load or force between the two faces can be ensured. Particularly preferably, the flat area of the first mounting face and/or the first retaining face are preferably at least 70 mm² in size. This achieves a particularly high security against twisting so as to facilitate mounting.

Suitably, the first retaining face and/or the first mounting face have a mean normal which is oriented substantially parallel to the first transverse direction. "Substantially parallel" here means that the two parallel directions may have an angle of ±20°, preferably ±10° and particularly preferably ±5°, and further preferably ±2° relative to each other. The substantially parallel normals of the retaining face and/or first mounting face to the first transverse direction achieves that only low forces result transversely to the first transverse direction by the form fit between the first retaining face and the mounting face, and thus a defined support is achieved which simplifies handling during mounting.

In a preferred embodiment, the first retaining face is substantially parallel to the first mounting face. Because the two contacting faces are formed substantially parallel, the contact takes place over a wide area and the two faces can transmit high forces without exceeding the permitted local surface loading. Faces are substantially parallel when the mean normals of the faces are oriented substantially parallel to each other.

Suitably, the first retaining region has a second retaining face, wherein the first mounting region has a second mounting face, and wherein the second retaining face is or can be brought into direct engagement with the second mounting face such that a displacement along a second transverse direction between the retaining element and the braking means support element is prevented by form fit. The second transverse direction stands perpendicularly to the axial direction and the first transverse direction. The second transverse direction is therefore in particular the direction which points from the axial direction to the brake shoes or to the center of the area of the frictional contact of the brake shoes with the brake disc. The form-fit support of the first retaining region, via the second retaining face, relative to the second mounting face of the mounting region in the second transverse direction further simplifies mounting of the bearing assembly, since little or no external manual support of the bearing assembly, in particular the retaining element, is required during mounting.

In a preferred embodiment, the second retaining face and/or the second mounting face have a mean normal which is oriented substantially parallel to the second transverse direction. This may achieve that the forces induced by the contact of these faces point substantially in the second transverse direction, so that substantially no forces are induced by this form-fit contact transversely to the second transverse direction, and hence handling during mounting and maintenance is simplified.

Preferably, the second retaining face is substantially parallel to the first mounting face. By forming the second retaining face substantially parallel to the second mounting face, it is achieved that these make contact with each other in particular over a wide area so that even high loads can be transmitted between the two faces.

Suitably, the first retaining region at least partially surrounds the first mounting region in the first transverse direction and/or in the second transverse direction. A partial surrounding in the first and/or second transverse direction is in particular characterized in that the first retaining region is or can be supported by form fit against a displacement relative to the first mounting region in the positive and negative first transverse direction, and/or in the positive and negative second transverse direction. Suitably, the first retaining region has a third retaining face, and the first mounting region has a third mounting face, wherein the normals of the third retaining face or third mounting face are preferably oriented substantially parallel to the normals of the second retaining face or mounting face. Alternatively or additionally, preferably, the first mounting region may also have two in particular parallel protrusions which extend in particular in the first transverse direction, wherein the first retaining region preferably extends at least partially between or can be introduced into the space between these two protrusions, so that a displacement transversely to the extension of the protrusions, in particular in the axial direction and/or in the second transverse direction, is prevented by form fit. Particularly preferably, one or both protrusions have the third retaining face or at least part thereof. The form-fit support in the positive and negative first transverse direction and/or in the positive and negative second transverse direction substantially simplifies support, in particular during the mounting process. Alternatively, preferably also the first mounting region may at least partially surround the first retaining region in the first transverse direction and/or in the second transverse direction.

Suitably, the first retaining region at least partially surrounds the first mounting region in the axial direction. The term "surrounds in the axial direction" means that the first retaining region is secured by form fit relative to the first mounting region against displacement in the positive and negative axial direction. The form-fit prevention of a relative movement between the first retaining region and the first mounting region in the axial direction achieves that during mounting, it is more difficult or impossible for the braking means support element to slip in the axial direction, thus simplifying mounting. The first retaining region can surround the first mounting region in particular in that the retaining region has two protrusions in the first transverse direction or in the second transverse direction, between which at least part of the first retaining region extends or can be introduced. Alternatively, preferably the first mounting region at least partially surrounds the first retaining region in the axial direction.

Preferably, the braking means support element has at least one mounting opening and the retaining element has at least one mounting hole, wherein a mounting opening aligns with a mounting hole and is configured to receive a mounting means. The mounting opening and the mounting hole may in principle have any cross section. Preferably however, this is at least partially round, in particular circular, so as to ensure economic production. The term "align" in this context means that the mounting opening aligns with a mounting hole such that the mounting means can be guided simultaneously through the mounting hole and mounting opening without needing to be deformed or destroyed. The "mounting means" here are means which serve to arrange or fix the braking means support element on the retaining element. In particular, the mounting means can be detached without destruction; preferably, the mounting means are screws or bolts. Alternatively, preferably the mounting means may however be rivets or other elements, wherein the essential factor is that the mounting means serve to connect together, preferably to clamp, the two main constituents of the bearing assembly. It is particularly preferred if the mounting opening or mounting hole has a thread in order to save installation space. Suitably, the mounting opening has the thread, because this can simplify assembly.

Preferably, the at least one mounting opening and the at least one mounting hole extend substantially perpendicularly to the axial direction. Two directions extends substantially perpendicularly to each other when they form with each other an angle of 75° to 105°, preferably 82° to 98°, and particularly preferably from 87° to 93°. By forming the mounting opening or mounting hole substantially perpendicularly to the axial direction, a bearing assembly is achieved which is particularly compact in the axial direction. Particularly preferably, at least one mounting opening or mounting hole here extends substantially parallel to the second transverse direction. Substantially parallel orientation of the mounting opening or mounting hole in the second transverse direction leads to a particularly compact bearing assembly, because the available installation space is utilized to the optimum.

Suitably, the first retaining region forms a first distal end of the retaining element, wherein the first mounting region forms a first distal end of the braking means support element, wherein the first distal ends delimit the retaining element and the braking means support element, in particular in the first transverse direction. By forming the mounting regions or retaining regions at the distal ends of the braking means support element or retaining element, it is ensured that a large moment about the axial direction can be achieved by means of only small forces in the first mounting region or first retaining region, so that the surface loading occurring—in the faces with form-fit transmission—can be kept low even if a high torque must be transmitted.

Preferably, the retaining element comprises a second retaining region, and the braking means support element comprises a second mounting region, wherein the second retaining region is or can be brought into form-fit engagement with the second mounting region such that a force, in particular parallel to the second transverse direction, can be transmitted between the second retaining region and the second mounting region by form fit. Preferably, the second retaining region is spaced from the first retaining region, and/or the second mounting region is spaced from the first mounting region, by at least 10 cm in order to achieve a certain security against wobble. This direct or indirect form-fit support of the second mounting region on the second retaining region ensures that a secure form-fit force transmission is achieved between the second retaining region and the second mounting region. In addition, the support also ensures that mounting can be simplified, since the form-fit contact in the second transverse direction acts as a mounting stop so that a particularly secure positioning can take place during mounting. This form-fit support in the second transverse direction is preferably configured such that the form-fit support takes place in the positive and/or negative second transverse direction. The negative second transverse direction here preferably points towards the axial direction starting from the brake pads.

In a preferred embodiment, the second retaining region and/or the second mounting region are mirror-symmetrical relative to a plane, wherein this plane of symmetry in particular has a normal in the axial direction. Preferably, the first retaining region is also designed or constructed so as to be mirror-symmetrical to the second retaining region, and/or the first mounting region so as to be mirror-symmetrical to the second mounting region. This mirror-symmetrical design of the retaining regions or mounting regions simplifies production so that costs can be saved.

In a preferred refinement, the second retaining region forms a second distal end of the retaining element, wherein the second mounting region forms a second distal end of the braking means support element, wherein the second distal ends delimit the retaining element and the braking means support element, in particular in the first transverse direction. By arranging the second mounting region or second retaining region at the respective second distal end, it is ensured that a high torque can be transmitted even by means of low forces, so that the surface loading of the contact regions is reduced and a particularly durable bearing assembly results. In particular, the first distal ends here lie opposite the second distal ends, and edge the retaining element or braking means support element in a positive or negative direction respectively, in particular in the first transverse direction. By forming these force-transmitting regions at distally opposite ends, amongst others a particularly high security against twisting is achieved so that mounting of the bearing assembly is simplified.

In a preferred embodiment, at least one mounting hole is arranged in the first mounting region and/or in the second mounting region, and at least one aligned mounting hole in the first retaining region and/or in the second retaining region. This ensures that the arrangement of the braking means support element on the retaining element only applies or can apply load to small areas about the mounting opening or mounting hole, since the mounting or retaining faces are physically situated directly adjacent to the mounting holes or mounting openings, so that the remaining areas of the component or components can be designed with thin walls so as to save weight. Particularly preferably, here a mounting opening punctures a second mounting face, and/or a mounting hole punctures a second retaining face.

Preferably, a first stop is arranged on the first mounting region and/or on the first retaining region. The first stop here is a protrusion or stop face which extends in particular in the first and/or second transverse direction and is configured to function as a limit in the axial direction. This stop is therefore designed to function as a form-fit stop in the positive or negative axial direction between the braking means support element and the retaining element. The first stop in particular is arranged or configured so that a displacement is prevented by form-fit when the mounting position is reached. In this way, mounting is simplified so that costs can be saved. Preferably, the first stop is formed such that it constitutes a separate component which is attached to the first mounting region and/or the first retaining region by substance bonding, form fit and/or force fit. In this way, a particularly simple production is achieved so that an economic bearing assembly results. Particularly preferably, the stop forms an edge to the first mounting region and/or the first retaining region in the axial direction. In this way, in particular a penetration of dirt into the supporting contacts can be avoided. Particularly preferably, two first stops are arranged on the first mounting region and/or the first retaining region, wherein the one first stop prevents a displacement in the positive axial direction and the other first stop in the negative axial direction, both by form fit. This achieves a particularly precise positioning during the mounting process so that the latter can be accelerated and hence costs saved.

Suitably, a second stop is arranged on the second mounting region and/or on the second retaining region. The second stop may here have the same features and advantages as the first stop, wherein the second stop is however arranged on the second mounting region and/or the second retaining region. Particularly preferably, two second stops are arranged on the second mounting region and/or the second retaining region, wherein the one second stop prevents displacement in the positive axial direction and the other second stop in the negative axial direction, both by form fit. This achieves a particularly precise positioning during the mounting process so the latter can be accelerated and hence costs saved. Particularly preferably, the first and second stops are positioned such that they counter the torque resulting from the weight force of the brake caliper and acting around the first mounting region.

Suitably, the braking means support element comprises at least one fixing region. The fixing regions serves to directly or indirectly receive a brake carrier, in particular a brake caliper, or fix the latter to the braking means support element. Particularly preferably, the fixing region comprises openings which extend preferably in the axial direction and are configured to receive guide elements or mounting means. The result is a particularly economic braking means support element. In addition, this achieves that pre-existing systems can be exchanged for the bearing assembly according to the invention for a brake carrier, and thus the advantages of the invention can also be made available in pre-existing systems.

In a further preferred embodiment, the first mounting region and/or the second mounting region comprise a fixing region. By arranging at least one fixing region, preferably all fixing regions, in the first or second mounting region, it is ensured that a particularly favorable force flow results so that the loaded areas in the braking means support element can be reduced. This means that many areas of the braking means support element may be designed with thin walls so as to save weight.

BRIEF DESCRIPTION OF THE DRAWINGS

Further advantages and features of the present invention arise from the description below with reference to the figures. Individual features of the embodiments depicted may also be used in other embodiments unless this is explicitly excluded. The drawings show.

DETAILED DESCRIPTION

Figure 1:
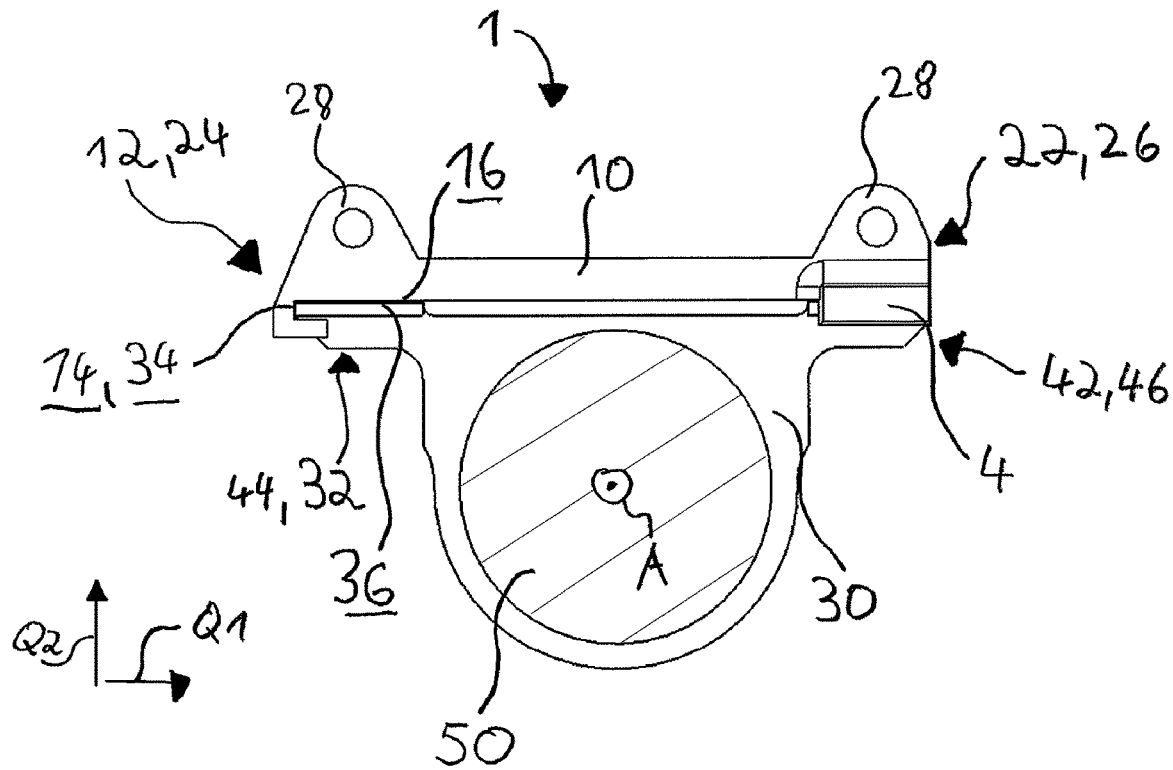
FIG. 1 is a partial cross-sectional side elevation view of a bearing assembly according to the invention for a brake carrier.

FIG. 1 shows a bearing assembly according to the invention for a brake carrier 1, wherein the bearing assembly has a braking means support element 10 and a retaining element 30. To transmit force between these two elements, the braking means support element 10 has a first mounting region 12 and a second mounting region 22, wherein the first mounting region 12 forms a first distal end 24 of the braking means support element 10 in the negative first transverse direction Q1, and the second mounting region 22 forms a second distal end 26 of the braking means support element 10 in the positive first transverse direction Q1. The first mounting region 12 has a first mounting face 14 and a second mounting face 16. The first mounting face 14 is oriented parallel to the first retaining face 34 of the first retaining region 32, wherein the first retaining region 32 forms a first distal end 44 of the retaining element 30, and the second retaining region 42 forms a second distal end 46 of the retaining element 30. These distal ends here edge the retaining element 30 in the positive and negative first transverse direction Q1. The second retaining face 36 is here oriented parallel to the second mounting face 16. In its middle portion in the first transverse direction Q1, the retaining element 30 surrounds the axle 50 on which the bearing assembly is fixed. The second retaining region 42 here has a second stop 4. In order to receive a brake carrier, the braking means support element 10 has two fixing regions 28, wherein these are formed or arranged respectively in the first mounting region 12 and in the second mounting region 22.

Figure 2:
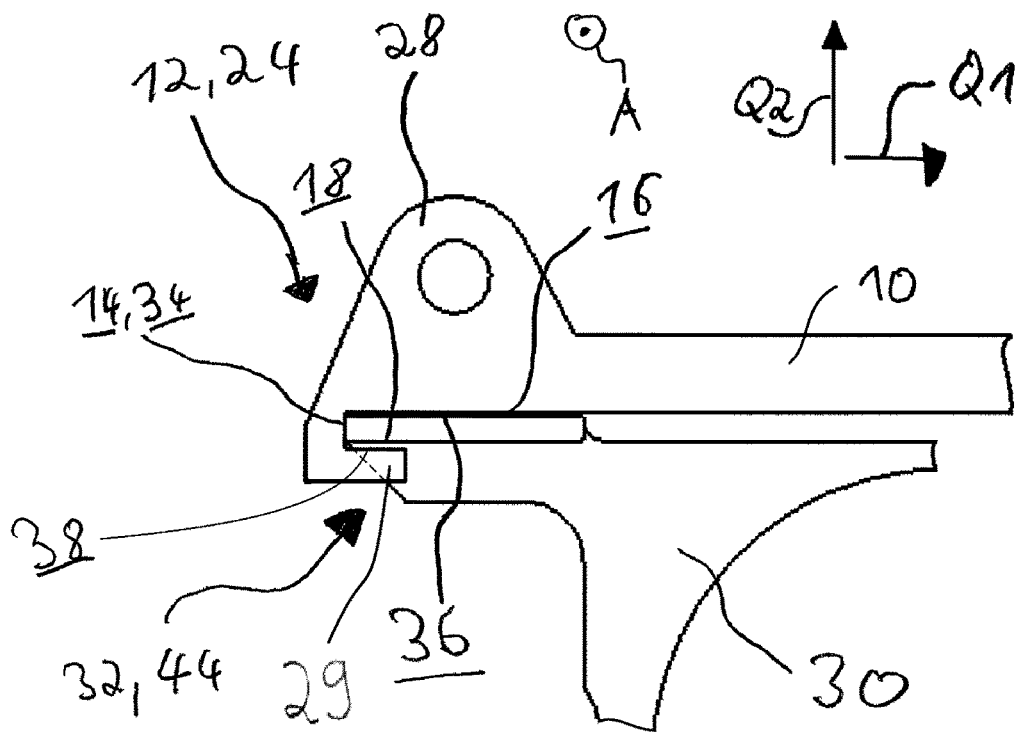
FIG. 2 is a side elevational view of an extract from an embodiment of a bearing assembly according to the invention for a brake carrier.

FIG. 2 shows an extract from an embodiment of the bearing assembly for a brake carrier 1, wherein the extract depicted could be used in the embodiment shown in FIG. 1. In the embodiment shown in FIG. 2, it is notable that the first mounting region 12 is designed so that two protrusions 29 surround the first retaining region 32 so that, inter alia, they secure the latter against a displacement in the positive and negative second transverse direction Q2 and also in the positive and negative axial direction A, both by form fit. Displacement in the positive transverse direction Q2 is prevented by the contact of the second mounting face 16 with the second retaining face 36, and in the negative second transverse direction by the contact of the third mounting face 18 with the third retaining face 38.

Figure 3:
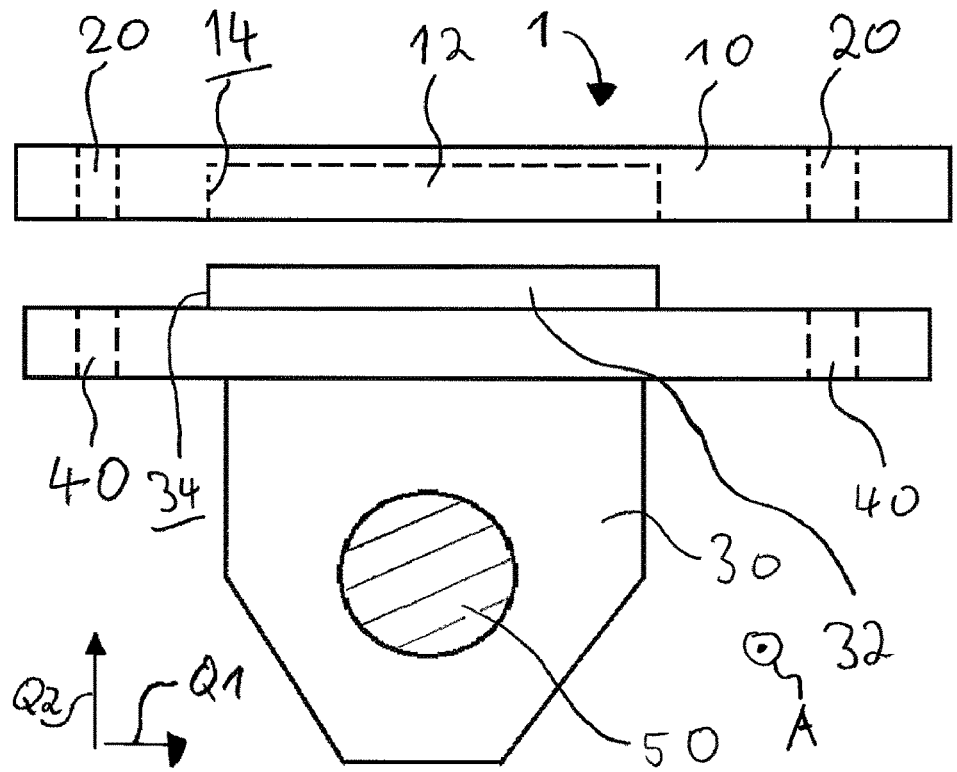
FIG. 3 is a partial cross-sectional, exploded side elevation view of a further embodiment of a bearing assembly according to the invention for a brake carrier.

FIG. 3 shows an exploded drawing of a bearing assembly for a brake carrier 1, wherein this exploded drawing shows the braking means support element 10 shortly before mounting to the retaining element 30. For assembly, the braking means support element 10 has two mounting openings 20 which each align with a mounting hole 40 of the first retaining element 30. In the embodiment shown, the first mounting region 12 is formed as a keyway which can be brought into engagement with the first retaining region 32 as a key, wherein the first mounting face 14 is oriented such that, by the first retaining face 34, this prevents displacement in the first transverse direction Q1 by form fit.

Figure 4:
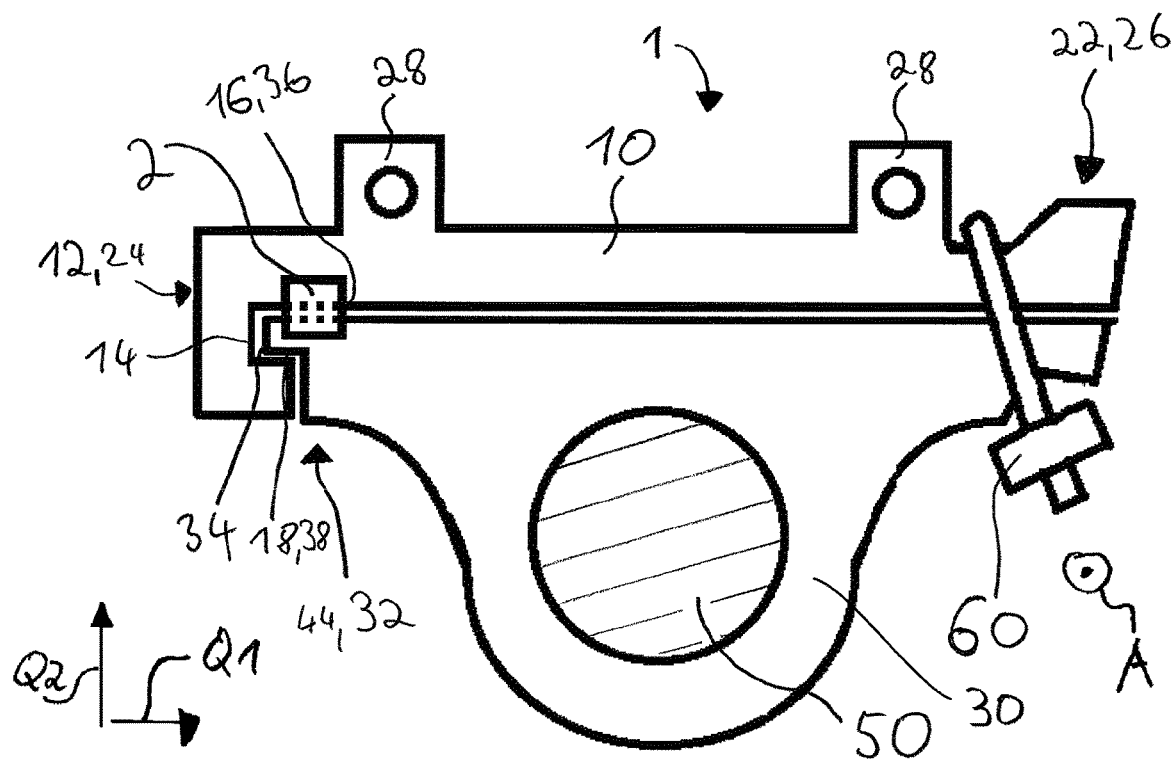
FIG. 4 is a partial cross-sectional side elevation view of an alternative embodiment of a bearing assembly according to the invention for a brake carrier.

FIG. 4 shows an alternative embodiment of a bearing assembly for a brake carrier 1, wherein the braking means support element 10 is clamped to the retaining element 30 via a mount 60 in the form of a clamping yoke. In the embodiment shown, it should be emphasized that the first mounting region 12 — which is arranged at the first distal end 24 of the braking means support element 10 — has a first stop 2 forming an end face in the axial direction A which can function as a form-fit stop face. The first mounting face 14 here adjoins the second mounting face 16 and the third mounting face 18 at right angles. The first retaining region 32 has a first retaining face 34 for contact with the first mounting face 14, a second retaining face 36 for contact with the second mounting face 16, and a third retaining face 38 for contact with the third mounting face 18, wherein these faces may each be oriented parallel to the respective other contact faces. To secure a brake carrier, the braking means support element 10 has two fixing regions 28 which each have an opening in the axial direction A.

Figure 5:
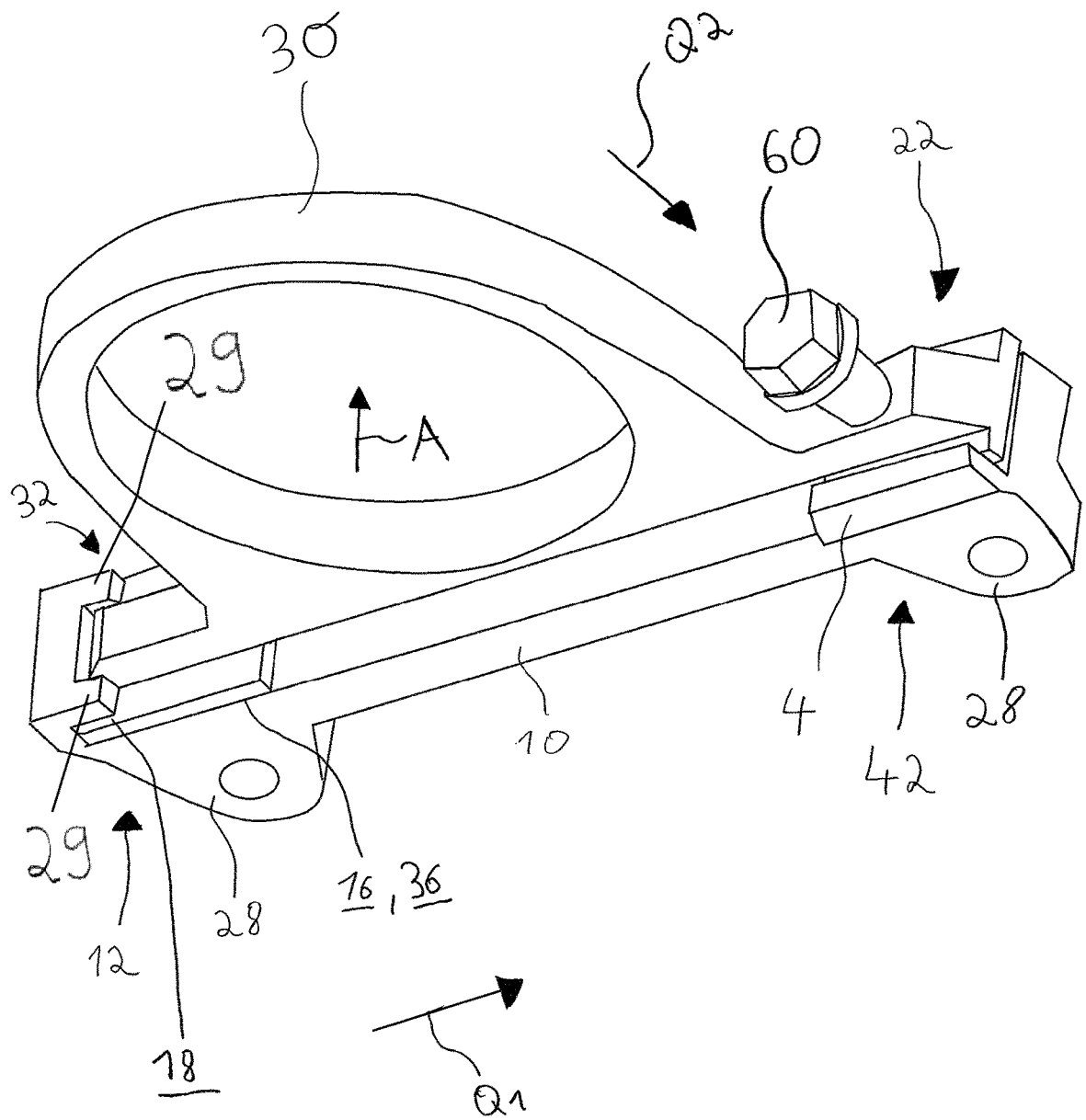
FIG. 5 is a partial cross-sectional side elevation view of a perspective view of an embodiment of a bearing assembly according to the invention for a brake carrier.

FIG. 5 shows a bearing assembly according to the invention for a brake carrier, wherein the first mounting region 12 of the braking means support element 10 surrounds the first retaining region 32 of the retaining element 30, in particular by two protrusions 29 which extend in the first transverse direction Q1, such that at least a relative displacement in the positive and negative second transverse direction Q2 and in the positive and negative axial direction A is prevented by form fit. The mounting means 60, which extends in the second transverse direction Q2, here serves to fix or clamp the second mounting region 22 relative to the second retaining region 42.

LIST OF REFERENCE SIGNS

1—Bearing assembly for a brake carrier
2—First stop
4—Second stop
10—Braking means support element
12—First mounting region
14—First mounting face
16—Second mounting face
18—Third mounting face
20—Mounting opening
22—Second mounting region
24—First distal end of braking means support element
26—Second distal end of braking means support element
28—Fixing region
29—Protrusion
30—Retaining element
32—First retaining region
34—First retaining face
36—Second retaining face
38—Third retaining face
40—Mounting hole
42—Second retaining region
44—First distal end of retaining element
46—Second distal end of retaining element
50—Axle
60—Mounting means
A—Axial direction
Q1—First transverse direction
Q2—Second transverse direction

The invention claimed is:

1. A bearing assembly for a brake carrier for a utility vehicle, comprising:
   a retaining element; and
   a brake support element;
   wherein the retaining element is fixed to an axle or a chassis component by form fit, substance bonding and/or force fit;
   wherein the axle extends along an axial direction;
   wherein the brake support element has a first mounting region;
   wherein the retaining element has a first retaining region; and
   wherein the first mounting region is configured to be brought into direct or indirect engagement with the first retaining region;
   such that a displacement along a first transverse direction between the retaining element and the brake support element is prevented by form fit, wherein the first transverse direction is substantially orthogonal to the axial direction;
   wherein the retaining element comprises a second retaining region, and the brake support element comprises a second mounting region;
   wherein the second retaining region is configured to be brought into form fit engagement with the second mounting region such that a force parallel to a second transverse direction, can be transmitted between the second retaining region and the second mounting region by the form fit, wherein the second transverse direction is substantially orthogonal to the first transverse direction;
   wherein the second retaining region forms a distal end of the retaining element;
   wherein the second mounting region forms a distal end of the brake support element; and
   wherein the distal ends delimit the retaining element and the brake support element in a first transverse direction.

2. The bearing assembly as claimed in claim 1, wherein the first retaining region and/or the first mounting region are mirror-symmetrical relative to a plane of symmetry, and wherein the plane of symmetry has a normal in the axial direction.

3. The bearing assembly as claimed in claim 2, wherein the first retaining region has a first retaining face, wherein the first mounting region has a first mounting face, and wherein the first retaining face and the first mounting face are configured directly to contact each other so that a displacement in the first transverse direction can be prevented by the direct contact of the first retaining face with the first mounting face.

4. The bearing assembly as claimed in claim 3, wherein the first retaining region has a second retaining face, wherein the first mounting region has a second mounting face, and wherein the second retaining face is configured to be brought into direct engagement with the second mounting face such that a displacement along a second transverse direction between the retaining element and the brake support element is prevented by form fit.

5. The bearing assembly as claimed in claim 4, wherein the first retaining region at least partially surrounds the first mounting region in the first transverse direction and/or in the second transverse direction.

6. The bearing assembly as claimed in claim 5, wherein the first retaining region at least partially surrounds the first mounting region in the axial direction.

7. The bearing assembly as claimed in claim 6, wherein the brake support element has at least one mounting opening and the retaining element has at least one mounting hole, and wherein a mounting opening aligns with a mounting hole and is configured to receive a mount configured to connect to the brake support element to the retaining element.

8. The bearing assembly as claimed in claim 1, wherein the brake support element has at least one mounting opening and the retaining element has at least one mounting hole, and wherein a mounting opening aligns with a mounting hole and is configured to receive a mount.

9. The bearing assembly as claimed in claim 8, wherein the at least one mounting opening and the at least one mounting hole extend substantially perpendicularly to the axial direction.

10. The bearing assembly as claimed in claim 1, wherein the first retaining region has a first retaining face, wherein the first mounting region has a first mounting face, and wherein the first retaining face and the first mounting face are configured directly to contact each other so that a displacement in the first transverse direction can be prevented by the direct contact of the first retaining face with the first mounting face.

11. The bearing assembly as claimed in claim 10, wherein the first retaining region has a second retaining face, wherein the first mounting region has a second mounting face, and wherein the second retaining face is configured to be brought into direct engagement with the second mounting face such that a displacement along a second transverse direction between the retaining element and the brake support element is prevented by form fit.

12. The bearing assembly as claimed in claim 1, wherein the first retaining region at least partially surrounds the first mounting region in the first transverse direction and/or in the second transverse direction.

13. The bearing assembly as claimed in claim 1, wherein the first retaining region at least partially surrounds the first mounting region in the axial direction.

14. A bearing assembly for a brake carrier for a utility vehicle, comprising:
   a retaining element; and
   a brake support element;
   wherein the retaining element is fixed to an axle or a chassis component by form fit, substance bonding and or force fit;
   wherein the axle extends along an axial direction;
   wherein the brake support element has a first mounting region;
   wherein the retaining element has a first retaining region; and
   wherein the first mounting region is configured to be brought into direct or indirect engagement with the first retaining region;
   such that a displacement along a first transverse direction between the retaining element and the brake support element is prevented b form fit;
   wherein the retaining element comprises a second retaining region, and the brake support element comprises a second mounting region;
   wherein the second retaining region is configured to be brought into form fit engagement with the second mounting region such that a force parallel to a second transverse direction, can be transmitted between the second retaining region and the second mounting region by the form fit;
   wherein the second retaining region forms a distal end of the retaining element;
   wherein the second mounting region forms a distal end of the brake support element;
   wherein the second distal ends delimit the retaining element and the brake support element in a first transverse direction;
   wherein the first retaining region and/or the first mounting region are mirror-symmetrical relative to a plane of symmetry, and wherein the plane of symmetry has a normal in the axial direction;
   wherein the first retaining region has a first retaining face, wherein the first mounting region has a first mounting face, and wherein the first retaining face and the first mounting face are configured directly to contact each other so that a displacement in the first transverse direction can be prevented by the direct contact of the first retaining face with the first mounting face;
   wherein the first retaining region has a second retaining face, wherein the first mounting region has a second mounting face, and wherein the second retaining face is configured to be brought into direct engagement with the second mounting face such that a displacement along a second transverse direction between the retaining element and the brake support element is prevented by form fit;
   wherein the first retaining region at least partially surrounds the first mounting region in the first transverse direction and/or in the second transverse direction;
   wherein the first retaining region at least partially surrounds the first mounting region in the axial direction;
   wherein the brake support element has at least one mounting opening and the retaining element has at least one mounting hole, and wherein a mounting opening aligns with a mounting hole and is configured to receive a mount configured to connect the brake support element to the retaining element; and
   wherein the at least one mounting opening and the at least one mounting hole extend substantially perpendicularly to the axial direction.

15. The bearing assembly as claimed in claim 14, wherein the distal end of the retaining element is a second distal end of the retaining element, wherein the distal end of the brake support element is a second distal end of the brake support element, wherein the first retaining region forms a first distal end of the retaining element, wherein the first mounting region forms a first distal end of the braking means support element, and wherein the first distal ends delimit the retaining element and the brake support element in the first transverse direction.

16. The bearing assembly as claimed in claim 15, wherein a first stop is arranged on the first mounting region and/or on the first retaining region.

17. The bearing assembly as claimed in claim 16, wherein a second stop is arranged on the second mounting region and/or on the second retaining region.

18. The bearing assembly as claimed in claim 17, wherein the brake support element comprises at least one fixing region.

19. The bearing assembly as claimed in claim 18, wherein the first mounting region and/or the second mounting region comprise a fixing region.

20. A bearing assembly for a brake carrier for a utility vehicle, comprising:
   a retaining element; and
   a brake support element;
   wherein the retaining element is fixed to an axle or a chassis component by form fit, substance bonding and/or force fit;

wherein the axle extends along an axial direction;
wherein the break support element has a first mounting region;
wherein the retaining element has a first retaining region; and
wherein the first mounting region is configured to be brought into direct or indirect engagement with the first retaining region;
such that a displacement along a first transverse direction between the retaining element and the brake support element is prevented by form fit;
wherein the retaining element comprises a second retaining element comprises a second retaining region, and the brake support element comprises a second mounting region;
wherein the second retaining region is configured to be brought into form fit engagement with the second mounting region such that a force parallel to a second transverse direction, can be transmitted between the second retaining region and the second mounting region by the form fit;
wherein the second retaining region forms a distal end of the retaining element;
wherein the second mounting region forms a distal end of the brake support element;
wherein the second distal ends delimit the retaining element and the brake support element in a first transverse direction;
wherein the first retaining region and/or the first mounting region are mirror-symmetrical relative to a plane of symmetry, and wherein the plane of symmetry has a normal in the axial direction;
wherein the first retaining region has a first retaining face, wherein the first mounting region has a first mounting face, and wherein the first retaining face and the first mounting face are configured directly to contact each other so that a displacement in the first transverse direction can be prevented by the direct contact of the first retaining face with the first mounting face;
wherein the first retaining region has a second retaining face, wherein the first mounting region has a second mounting face, and wherein the second retaining face is configured to be brought into direct engagement with the second mounting face such that a displacement along a second transverse direction between the retaining element and the brake support element is prevented by form fit;
wherein the first retaining region at least partially surrounds the first mounting region in the first transverse direction and/or in the second transverse direction;
wherein the first retaining region at least partially surrounds the first mounting region in the axial direction;
wherein the brake support element has at least one mounting opening and the retaining element has at least one mounting hole and wherein a mounting opening aliens with a mounting hole and is configured to receive a mount configured to connect the brake su ort element to the retaining element; and
wherein the mount includes a clamping yoke.

* * * * *

UNITED STATES PATENT AND TRADEMARK OFFICE
CERTIFICATE OF CORRECTION

| | |
|---|---|
| PATENT NO. | : 11,566,673 B2 |
| APPLICATION NO. | : 16/762377 |
| DATED | : January 31, 2023 |
| INVENTOR(S) | : Mark Hartmann and Stefan Wallmeier |

Page 1 of 1

It is certified that error appears in the above-identified patent and that said Letters Patent is hereby corrected as shown below:

In the Specification

Column 5, Line 30:
"extends" should be – extend –

In the Claims

Column 10, Claim 1, Line 29:
After "direction" delete ","

Column 11, Claim 7, Line 6 (1st occurrence):
Delete "to"

Column 11, Claim 14, Line 44:
"and or" should be – and/or –

Column 11, Claim 14, Line 56:
"b" should be – by –

Column 13, Claim 20, Line 13:
Delete "element comprises a second retaining"

Column 13, Claim 20, Line 19:
Delete ","

Column 14, Claim 20, Line 25:
After "hole" insert -- , --

Column 14, Claim 20, Line 27:
"su ort" should be – support –

Signed and Sealed this
Second Day of January, 2024

Katherine Kelly Vidal
*Director of the United States Patent and Trademark Office*